United States Patent
Chien

(10) Patent No.: US 8,943,160 B2
(45) Date of Patent: Jan. 27, 2015

(54) METHODS FOR CONTROLLING ONGOING TRIGGERED SUPL SESSION BY SLP AND NETWORK-SIDE SUPL AGENT

(75) Inventor: Ho-Sung Chien, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 185 days.

(21) Appl. No.: 13/344,283

(22) Filed: Jan. 5, 2012

(65) Prior Publication Data

US 2012/0185599 A1 Jul. 19, 2012

Related U.S. Application Data

(60) Provisional application No. 61/433,734, filed on Jan. 18, 2011.

(51) Int. Cl.
*G06F 15/16* (2006.01)
*H04L 29/08* (2006.01)
*H04L 29/06* (2006.01)
*H04W 12/08* (2009.01)

(52) U.S. Cl.
CPC ............ *H04L 67/141* (2013.01); *H04L 63/107* (2013.01); *H04W 12/08* (2013.01)
USPC ............................ 709/207; 709/223; 709/224

(58) Field of Classification Search
USPC ......... 709/202, 203, 218, 219, 223, 224, 226, 709/227, 228, 229
See application file for complete search history.

(56) References Cited

U.S. PATENT DOCUMENTS

| 8,359,381 | B2 * | 1/2013 | Choi ............................. 709/223 |
| 8,417,266 | B2 * | 4/2013 | Kim et al. ..................... 455/457 |
| 2010/0203902 | A1 | 8/2010 | Wachter et al. |
| 2010/0228846 | A1 * | 9/2010 | Choi ............................. 709/223 |
| 2011/0022710 | A1 * | 1/2011 | Choi ............................. 709/224 |

FOREIGN PATENT DOCUMENTS

| CN | 101002494 A | 7/2007 |
| CN | 101848415 A | 9/2010 |

\* cited by examiner

*Primary Examiner* — Barbara Burgess
(74) *Attorney, Agent, or Firm* — Birch, Stewart, Kolasch & Birch, LLP

(57) ABSTRACT

A method for controlling an ongoing network-initiated triggered session in compliance with a Secure User Plane Location (SUPL) standard is provided, and the method proposes that the SUPL Agent sends a request to the SUPL Location Platform (SLP), so that the SLP further indicates the target SUPL Enabled Terminal (SET) to pause the ongoing network-initiated triggered session via a SUPL TRIGGERED STOP message. Also, a method for controlling an ongoing SET-initiated triggered session is provided, and the method proposes that the SLP indicates the target SET to pause the ongoing SET-initiated triggered session via a SUPL TRIGGERED STOP message.

14 Claims, 7 Drawing Sheets

METHODS FOR CONTROLLING ONGOING TRIGGERED SUPL SESSION BY SLP AND NETWORK-SIDE SUPL AGENT

CROSS REFERENCE TO RELATED APPLICATIONS

This Application claims priority of U.S. Provisional Application No. 61/433,734, filed on Jan. 18, 2011, and the entirety of which is incorporated by reference herein.

BACKGROUND OF THE INVENTION

1. Field of the Invention

The invention generally relates to controls of a triggered Secure User Plane Location (SUPL) session, and more particularly, to methods for a SUPL Location Platform (SLP) and network-side SUPL Agent to pause and resume an ongoing triggered SUPL session.

2. Description of the Related Art

Location Based Services (LBS) related applications are becoming more and more popular in today's mobile markets. For mobile subscribers, using LBS related applications on mobile phones (also known as cellular or cell phones), smart phones, laptop computers with wireless communications capability, or other mobile devices, require a user's location to be available as quickly and accurately as possible. Although the Global Positioning System (GPS) has been the main solution to this need for several years now, it has its limitations. Generally, the GPS works fine in rural areas but often works barely in urban area or in buildings. Thus, it is commonly proposed to supplement the GPS with assistance and positioning data provided by the networks employing other positioning methods. The assistance and positioning data can be exchanged between the mobile phones and the networks over either the control plane or the user plane. A control plane implementation uses a dedicated control channel, and this approach has been used for emergency services, such as the E911 mandate in the United States. However, it also adds significant network overhead, due to the software and hardware changes needed to various network components to support the location-specific messages. To this end, the user plane implementations have grown in popularity in recent years for non-critical commercial location applications.

As one of the user plane implementations, the Secure User Plane Location (SUPL) was developed by the Open Mobile Alliance (OMA) to support Location-Based Services (LBS) for wireless communications in various wireless technologies, such as the General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others. A basic SUPL architecture is composed of a SUPL Location Platform (SLP), a target SUPL Enabled Terminal (SET), and a network-side SUPL Agent, wherein the SLP is an entity responsible for Location Service Management and Position Determination, the target SET is a logical entity in a device that is capable of communicating with a SUPL Network, and the network-side SUPL Agent is a software and/or hardware entity accessing the SUPL enabler in order to obtain location information. According to the OMA-AD-SUPL, v 3.0, specification, the OMA-TS-ULP, v 3.0, specification, and the OMA-TS-MLP, v 3.3, specification, pause and resumption of an ongoing triggered SUPL session is only defined to be initiated by the target SET. However, there may be situations where the network-side SUPL Agent and/or the SLP may have to initiate pause and resumption of an ongoing triggered SUPL session. For example, during an on-going triggered SUPL session which is a periodic session for the target SET to report its position to the SLP every 5 seconds and to stop reporting after 5 hours, the target SET will periodically report its position according to the setting, even if its position seldomly changes or doesn't change at all, and a lot of reports indicating the same position result will be sent to the SLP. As the SLP may generally have many different SUPL sessions on-going simultaneously with different target SETs, it is therefore desirable for the SLP or the network-side SUPL Agent to have the capability to pause or resume one particular on-going triggered SUPL session (e.g. to pause for 30 minutes and then resume), so that the traffic loading of the SLP may be efficiently reduced.

BRIEF SUMMARY OF THE INVENTION

In a first aspect of the invention, a method for controlling an ongoing network-initiated triggered session in compliance with the SUPL standard is provided. The method comprises the steps of initiating, by a SUPL Agent, a triggered session with a target SET via an SLP of the target SET, receiving, by the SLP, a pause request for the triggered session from the SUPL Agent during the triggered session, and receiving, by the target SET, a first SUPL TRIGGERED STOP message from the SLP, wherein the first SUPL TRIGGERED STOP message indicates the target SET to pause the triggered session and is sent by the SLP in response to the pause request.

In a second aspect of the invention, a SUPL Agent entity comprising a plurality of processor logic is provided. One of the processor logic initiates a triggered session with a target SET via an SLP of the target SET. Another one of the processor logic sends a pause request for the triggered session to the SLP during the triggered session, so as to enable the SLP to send a first SUPL TRIGGERED STOP message to the target SET to pause the triggered session.

In a third aspect of the invention, a SET with a wireless module and a processing module is provided. The wireless module performs wireless transmissions and receptions to and from an SLP. The processing module receives a first SUPL TRIGGERED STOP message from the SLP via the wireless module, and pauses an ongoing network-initiated triggered session with a SUPL Agent in response to the first SUPL TRIGGERED STOP message.

In a fourth aspect of the invention, a method for controlling an ongoing SET-initiated triggered session is provided. The method comprises the steps of initiating, by a target SET, a triggered session with an SLP of the target SET, and receiving, by the target SET, a first SUPL TRIGGERED STOP message from the SLP during the triggered session, wherein the first SUPL TRIGGERED STOP message indicates the target SET to pause the triggered session.

In a fifth aspect of the invention, a SET with a wireless module and a processing module is provided. The wireless module performs wireless transmissions and receptions to and from an SLP. The processing module initiates a triggered session with the SLP via the wireless module, and receives a first SUPL TRIGGERED STOP message from the SLP via the wireless module. Also, the processing module pauses the triggered session in response to the first SUPL TRIGGERED STOP message.

In a sixth aspect of the invention, an SLP entity comprising a plurality of processor logic is provided. One of the processor logic handles a triggered session initiated by a target SET. Another one of the processor logic sends a first SUPL TRIGGERED STOP message to the target SET to pause the triggered session.

Other aspects and features of the present invention will become apparent to those with ordinarily skill in the art upon review of the following descriptions of specific embodiments of apparatuses and methods for controlling an ongoing network-initiated and SET-initiated triggered session.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the OMA specifications described herein are used to teach the spirit of the invention, and the invention is not limited thereto.

Figure 1:
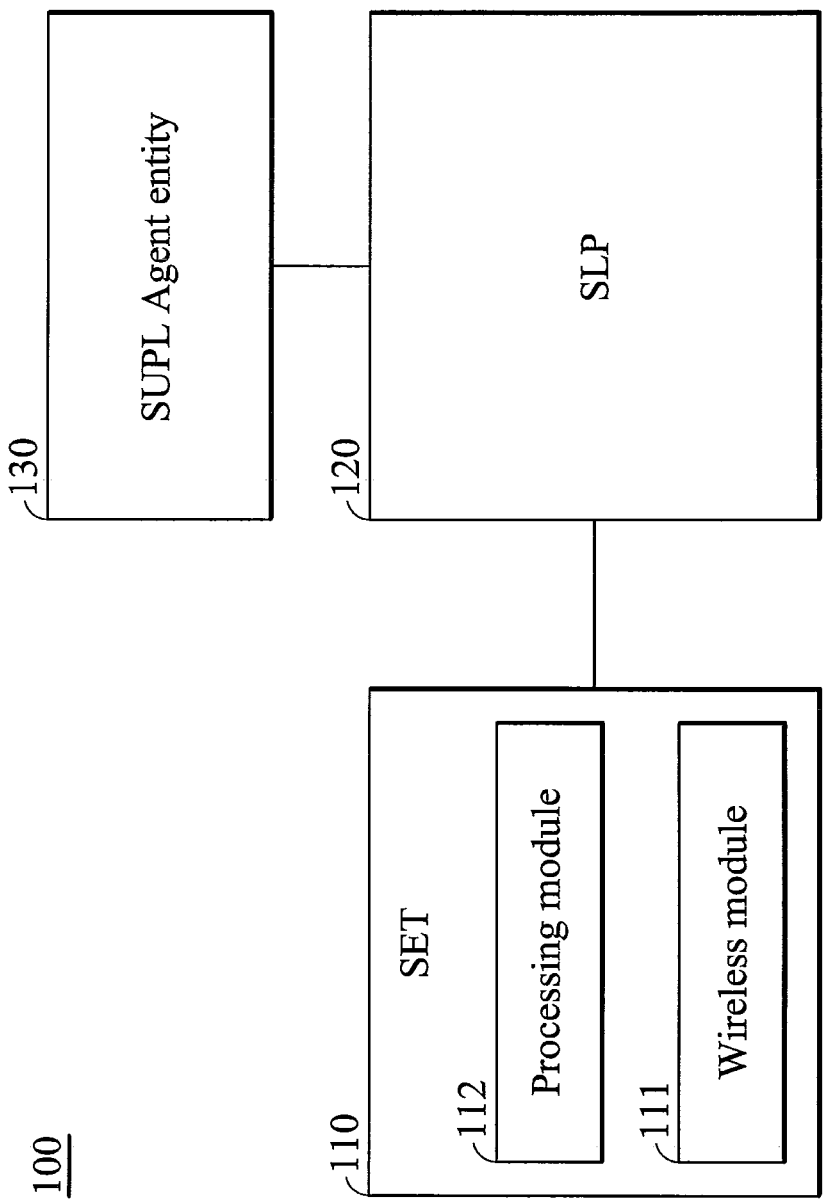
FIG. 1 is a block diagram illustrating a SUPL communication environment according to an embodiment of the invention.

FIG. 1 is a block diagram illustrating a SUPL communication environment according to an embodiment of the invention. In the SUPL communication environment 100, the SET 110 is wirelessly connected to the SLP 120, and the SUPL Agent entity 130 is connected to the SLP 120 wirelessly or through wire(s). The SLP 120 may be a Home-SLP (H-SLP) or Visited-SLP (V-SLP) for the SET 110, which may be a function entity for location service management and position determination in a service network, such as a GPRS/EDGE network, WCDMA network, LTE network, or others. The SET 110 may be a mobile communication device which is capable of executing a SUPL agent for communicating with the SLP 120. The SUPL Agent entity 130 may be any computing device which is capable of executing a SUPL agent for communicating with the SLP 120, wherein the SUPL agent executing by the SUPL Agent entity 130 may be referred to as a network-side SUPL agent.

The SET 110 comprises a wireless module 111 for performing the functionality of wireless transmissions and receptions to and from the SLP 120, and a processing module 112 for controlling the operation of the wireless module 111 and other functional components, such as a display unit and/or keypad serving as the MMI (man-machine interface), a storage unit storing the program codes of SUPL-related applications or communication protocols, or others. To further clarify, the wireless module 111 may comprise a baseband unit and a radio frequency (RF) unit, and the processing module 112 may be a general-purpose processor or a micro-control unit (MCU). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the Radio Access Technology (RAT) in use. The SUPL Agent entity 130 may comprise at least a processing module, such as a general-purpose processor or an MCU, which comprises a plurality of processor logic for performing the SUPL functions of communicating with the SLP 120. Similarly, the SLP 120 may comprise at least a processing module, such as a general-purpose processor or an MCU, which comprises a plurality of processor logic for performing the functions of location service management and position determination.

Figure 2:
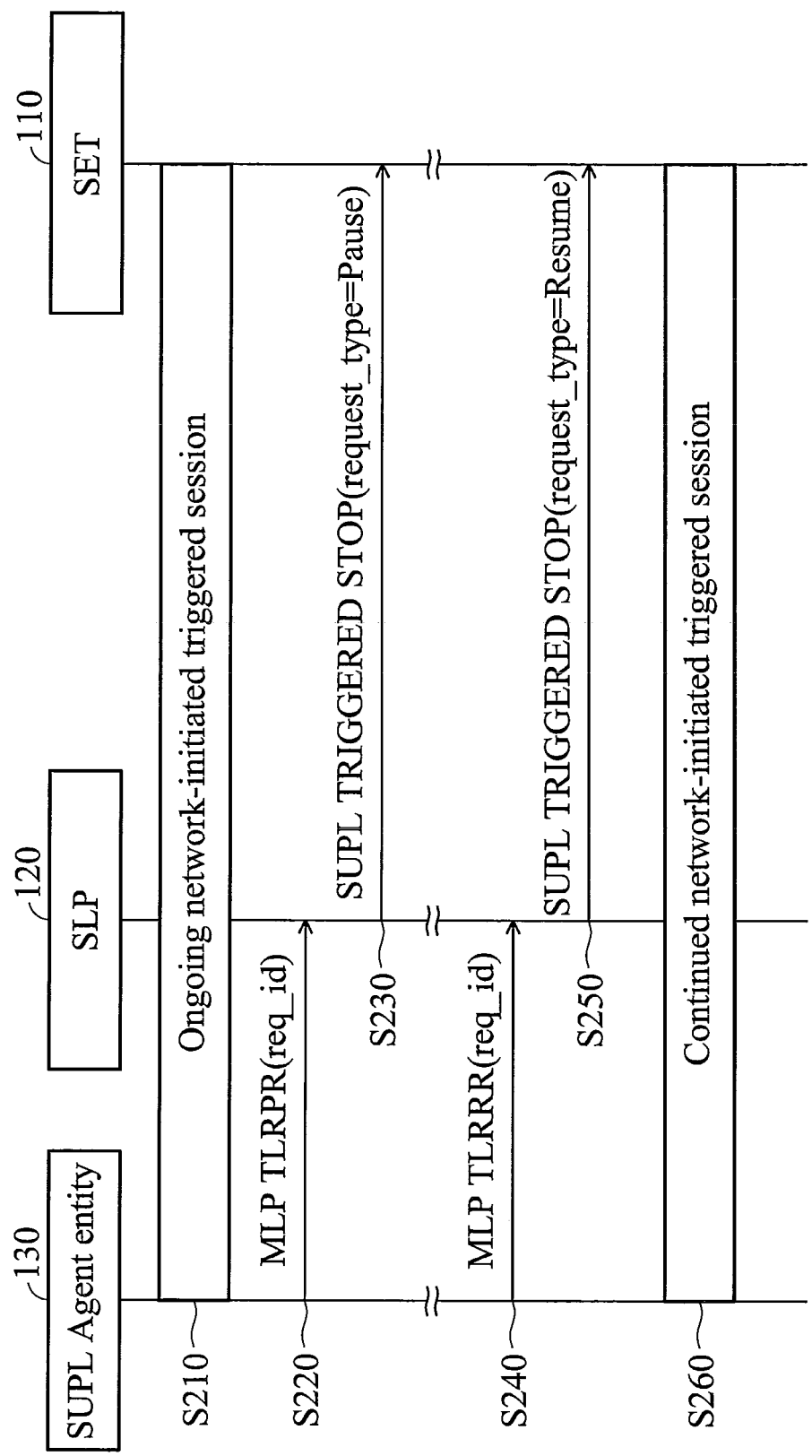
FIG. 2 is a message sequence chart illustrating a network-side SUPL agent requesting to pause and resume an ongoing network-initiated triggered session according to an embodiment of the invention.

FIG. 2 is a message sequence chart illustrating a network-side SUPL agent requesting to pause and resume an ongoing network-initiated triggered session according to an embodiment of the invention. As shown in FIG. 2, the SUPL Agent entity 130 first initiates a network-initiated triggered session with the SET 110 via the SLP 120 (step S210). Next, the SUPL Agent entity 130 is further required to pause the ongoing network-initiated triggered session. Specifically, the SUPL Agent entity 130 sends an MLP TLRPR (MLP Triggered Location Request Pause Request) message to the SLP 120, which comprises a request identification (denoted as "req_id" in FIG. 2) (step S220). When receiving the MLP TLRPR message, the SLP 120 sends a SUPL TRIGGERED STOP message to the SET 110, which comprises a request type indicating the SET 110 to pause the ongoing network-initiated triggered session (step S230). In one embodiment, the SUPL TRIGGERED STOP message may further comprise the session identification of the network-initiated triggered session. Later, when the SUPL Agent entity 130 is required to resume the paused network-initiated triggered session, it sends an MLP TLRRR (MLP Triggered Location Request Resume Request) message to the SLP 120, which comprises the request identification of the MLP TLRPR message (step S240). When receiving the MLP TLRPR message, the SLP 120 sends a SUPL TRIGGERED STOP message to the SET 110, which comprises a request type indicating the SET 110 to resume the paused network-initiated triggered session (step S250). In one embodiment, the SUPL TRIGGERED STOP message may further comprise the session identification of the network-initiated triggered session, i.e., the same session identification carried in the SUPL TRIGGERED STOP message as in step 230. Thus, the paused network-initiated triggered session is resumed by the SET 110 in response to the SUPL TRIGGERED STOP message (step S260). Note that, unlike the conventional design of pause and resumption of an ongoing network-initiated triggered session, the network-side SUPL agent is allowed to initiate the pause and resumption of an ongoing network-initiated triggered session. Particularly, the SUPL TRIGGERED STOP messages in the steps S230 and S250 are sent from the SLP 120 to the SET 110.

Figure 3:
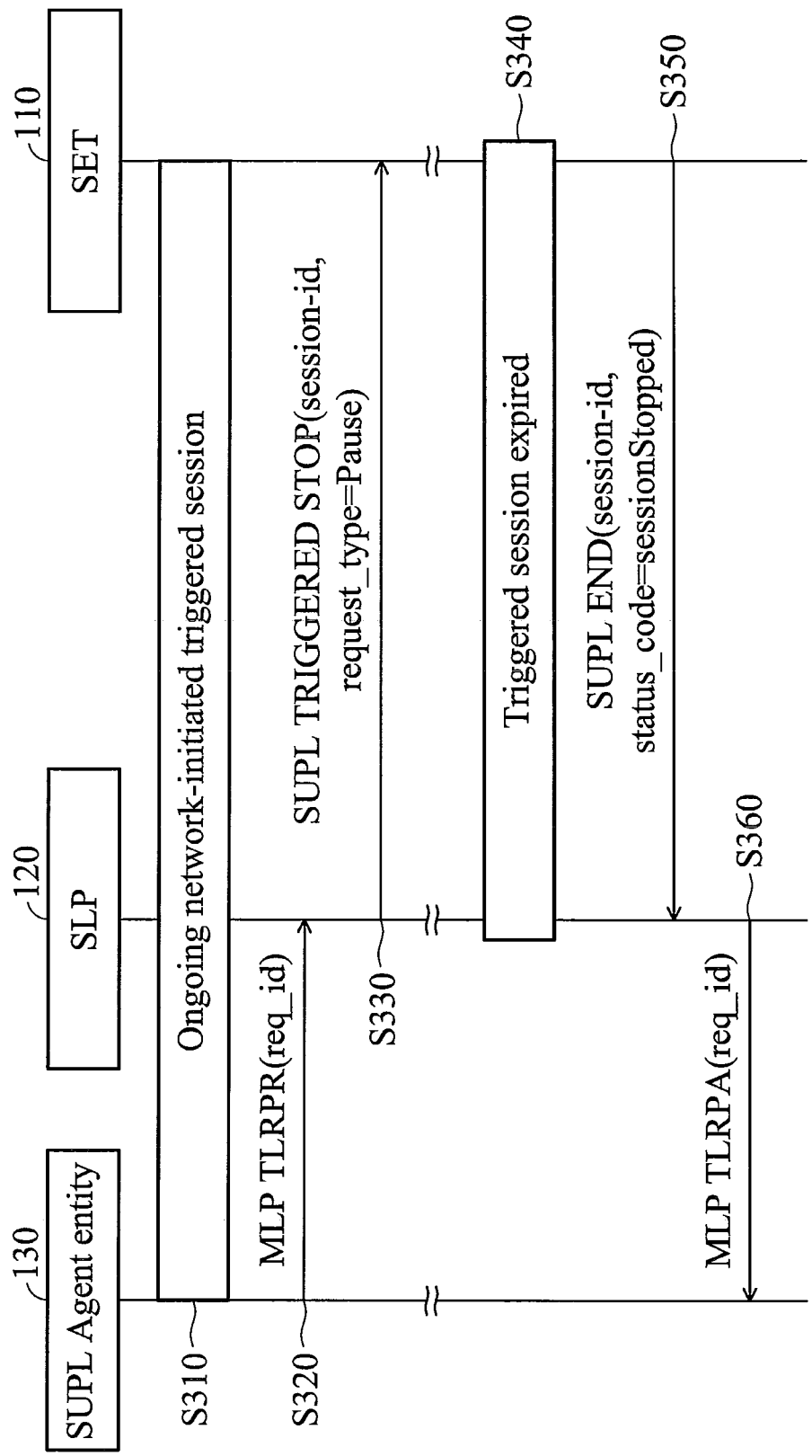
FIG. 3 is a message sequence chart illustrating a network-side SUPL agent requesting to pause and resume an ongoing network-initiated triggered session according to another embodiment of the invention.

FIG. 3 is a message sequence chart illustrating a network-side SUPL agent requesting to pause and resume an ongoing network-initiated triggered session according to another embodiment of the invention. Similar to FIG. 2, the SUPL Agent entity 130 first initiates a network-initiated triggered session with the SET 110 via the SLP 120 (step S310). Next, the SUPL Agent entity 130 is further required to pause the ongoing network-initiated triggered session. Specifically, the SUPL Agent entity 130 sends an MLP TLRPR message to the SLP 120, which comprises a request identification (denoted as "req_id" in FIG. 3) (step S320). When receiving the MLP TLRPR message, the SLP 120 sends a SUPL TRIGGERED STOP message to the SET 110, which comprises a session identification (denoted as "session_id" in FIG. 3) of the ongoing network-initiated triggered session and a request type indicating the SET 110 to pause the ongoing network-initiated triggered session (step S330). Later, before the SUPL Agent entity 130 is required to resume the paused network-initiated triggered session, the processing module 112 detects that the paused network-initiated triggered session has expired (step S340). In response to the paused network-initiated triggered session being expired, the processing module 112 sends a SUPL END message to the SLP 120 via the wireless module 111, which comprises the session identification of the expired network-initiated triggered session (i.e., the same session identification carried in the SUPL TRIGGERED STOP message) and a status code indicating that the expired network-initiated triggered session should be stopped (step S350). When receiving the SUPL END message, the SLP 120 sends a MLP TLRPA (MLP Triggered Location Request Pause Answer) message to the SUPL Agent entity 130, which comprises the request identification of the MLP TLRPR message (step S360). Thus, the expired network-initiated triggered session is stopped.

Figure 4:
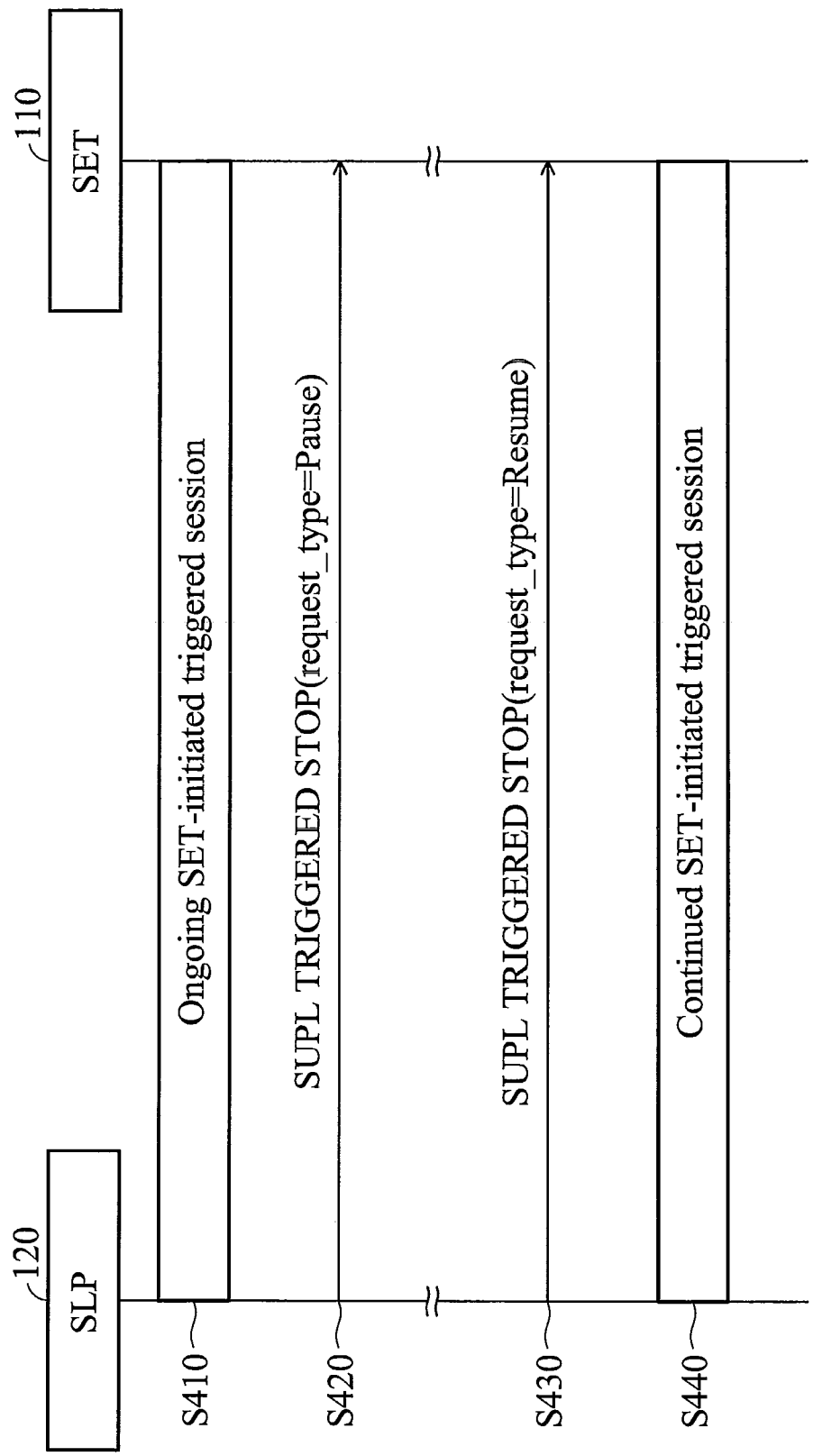
FIG. 4 is a message sequence chart illustrating an SLP requesting to pause and resume an ongoing SET-initiated triggered session according to an embodiment of the invention.

FIG. 4 is a message sequence chart illustrating an SLP requesting to pause and resume an ongoing SET-initiated triggered session according to an embodiment of the invention. At first, an SET-initiated triggered session between the SLP 120 and the SET 110 is performed (step S410). During the ongoing SET-initiated triggered session, the SLP 120 is required to request pause of the ongoing SET-initiated triggered session. Specifically, the SLP 120 sends a SUPL TRIGGERED STOP message to the SET 110, which comprises a request type indicating the SET 110 to pause the ongoing SET-initiated triggered session (step S420). Later, when the SLP 120 is required to request resumption of the paused SET-initiated triggered session, it sends a SUPL TRIGGERED STOP message to the SET 110, which comprises a request type indicating the SET 110 to resume the paused SET-initiated triggered session (step S430). In one embodiment, each of the SUPL TRIGGERED STOP messages in the step S420 and S430 may further comprise the session identification of the ongoing SET-initiated triggered session, i.e., the session identifications carried in the SUPL TRIGGERED STOP messages in the step S420 and S430 are the same. Thus, the paused SE-initiated triggered session is resumed by the SET 110 in response to the SUPL TRIGGERED STOP message (step S440). Note that, unlike the conventional design of pause and resumption of an ongoing SET-initiated triggered session, the SLP is allowed to initiate the pause and resumption of an ongoing SET-initiated triggered session. Particularly, the SUPL TRIGGERED STOP messages in the steps S420 and S430 are sent from the SLP 120 to the SET 110.

Figure 5:
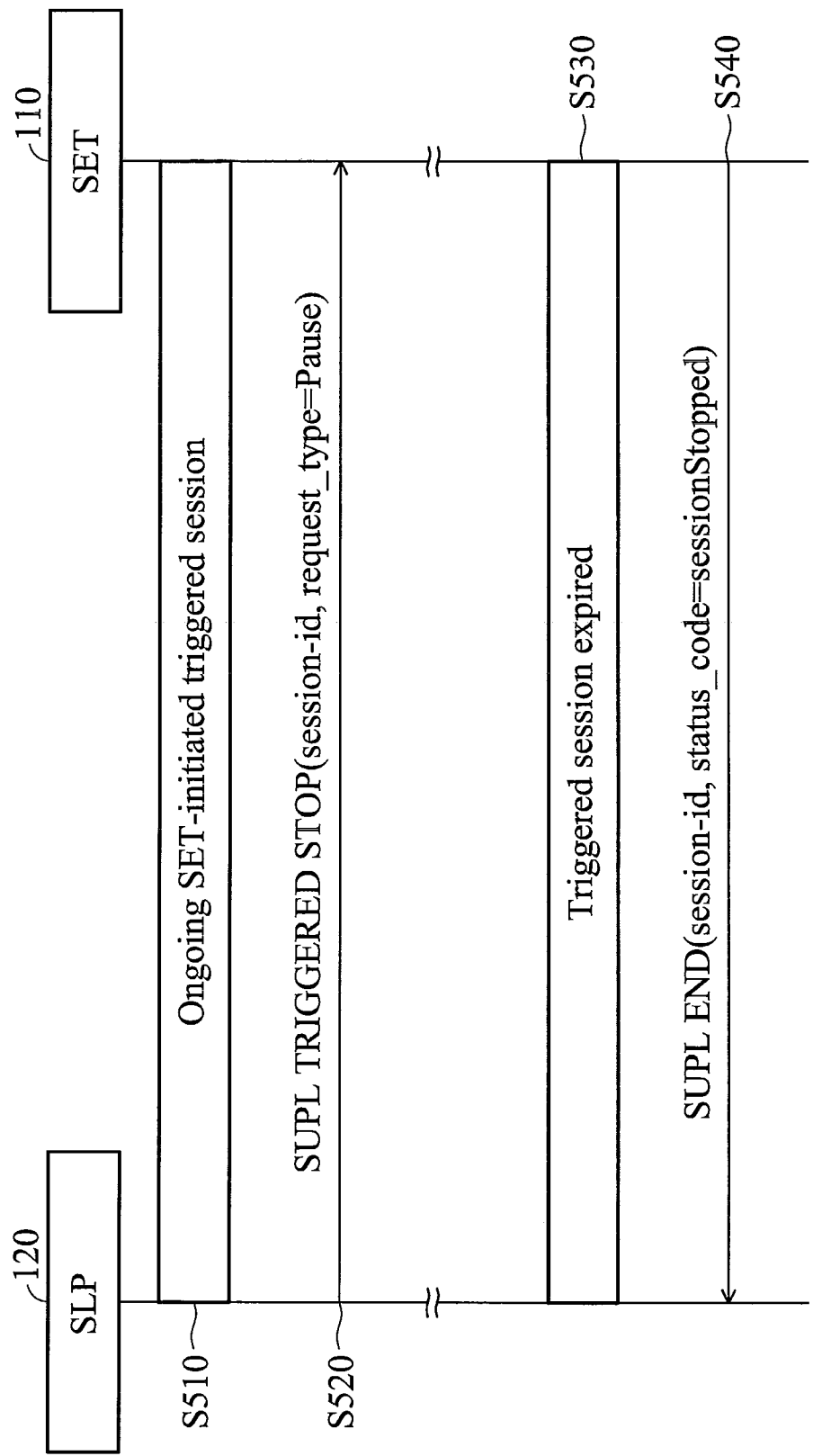
FIG. 5 is a message sequence chart illustrating an SLP requesting to pause and resume an ongoing SET-initiated triggered session according to another embodiment of the invention.

FIG. 5 is a message sequence chart illustrating an SLP requesting to pause and resume an ongoing SET-initiated triggered session according to another embodiment of the invention. Similar to FIG. 4, an SET-initiated triggered session between the SLP 120 and the SET 110 is performed (step S510). During the ongoing SET-initiated triggered session, the SLP 120 is required to request pause of the ongoing SET-initiated triggered session. Specifically, the SLP 120 sends a SUPL TRIGGERED STOP message to the SET 110, which comprises a session identification (denoted as "session_id" in FIG. 5) of the ongoing SET-initiated triggered session and a request type indicating the SET 110 to pause the ongoing SET-initiated triggered session (step S520). Later, before the SLP 120 is required to request resumption of the paused SE-initiated triggered session, the processing module 112 detects that the paused SET-initiated triggered session has expired (step S530). In response to the paused SE-initiated triggered session being expired, the processing module 112 sends a SUPL END message to the SLP 120 via the wireless module 111, which comprises the session identification of the expired SET-initiated triggered session (i.e., the same session identification carried in the SUPL TRIGGERED STOP message) and a status code indicating that the expired SET-initiated triggered session should be stopped (step S540). Thus, the expired SET-initiated triggered session is cancelled.

Figure 6:
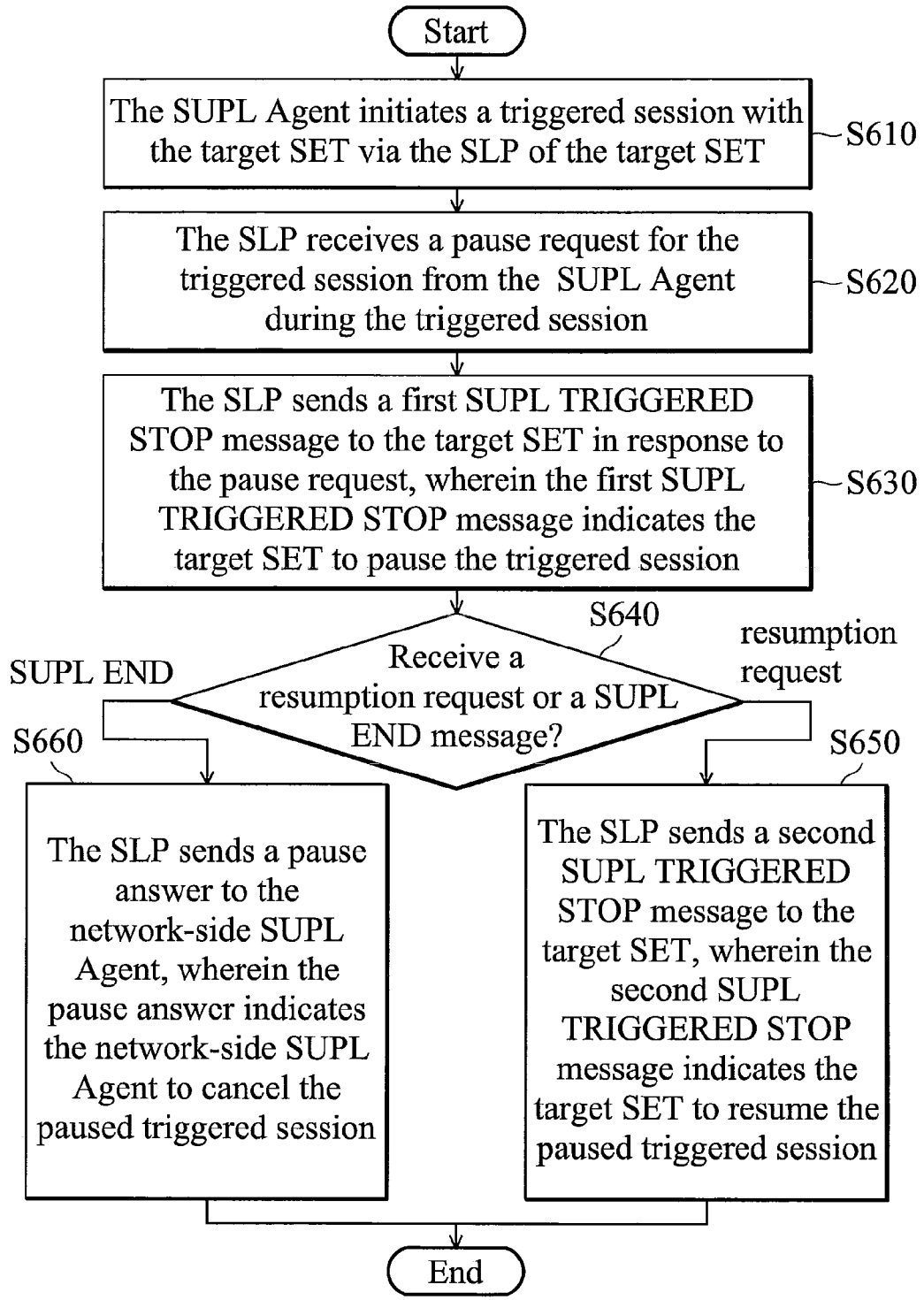
FIG. 6 is a flow chart illustrating a method for controlling an ongoing network-initiated triggered session in compliance with the SUPL standard according to an embodiment of the invention.

FIG. 6 is a flow chart illustrating a method for controlling an ongoing network-initiated triggered session in compliance with the SUPL standard according to an embodiment of the invention. The method may be applied in a SUPL communication environment comprising a target SET, an SLP of the target SET, and a network-side SUPL Agent. To begin the method, the network-side SUPL Agent first initiates a triggered session with the target SET via the SLP (step S610). The triggered session is generally referred to as a network-initiated triggered session. Next, the SLP receives a pause request for the triggered session from the network-side SUPL Agent during the triggered session (step S620). Specifically, the pause request may be an MLP TLRPR message which comprises a request identification. In response to the pause request, the SLP sends a first SUPL TRIGGERED STOP message to the target SET, wherein the first SUPL TRIGGERED STOP message indicates the target SET to pause the triggered session (step S630). In another embodiment, the first SUPL TRIGGERED STOP message may further comprise the session identification of the triggered session. Thus, the triggered session may be paused properly by the network-side SUPL Agent. After that, the SLP determines whether a resumption request for the paused triggered session is received from the network-side SUPL Agent, or a SUPL END message indicating that the paused triggered session has expired is received from the target SET (step S640). If a resumption request for the paused triggered session is received from the network-side SUPL Agent, the SLP sends a second SUPL TRIGGERED STOP message to the target SET, wherein the second SUPL TRIGGERED STOP message indicates the target SET to resume the paused triggered session (step S650). Specifically, the resumption request may be an MLP TLRRR message which comprises the request identification of the MLP TLRPR message. Otherwise, if a SUPL END message indicating that the paused triggered session has expired is received from the target SET, the SLP sends a pause answer to the network-side SUPL Agent, wherein the pause answer indicates the network-side SUPL Agent to cancel the paused triggered session (step S660). In another embodiment, the SUPL END message may further comprise the session identification of the triggered session. Specifically, the pause answer may be an MLP TLRPA message which comprises the request identification of the MLP TLRPR message.

Figure 7:
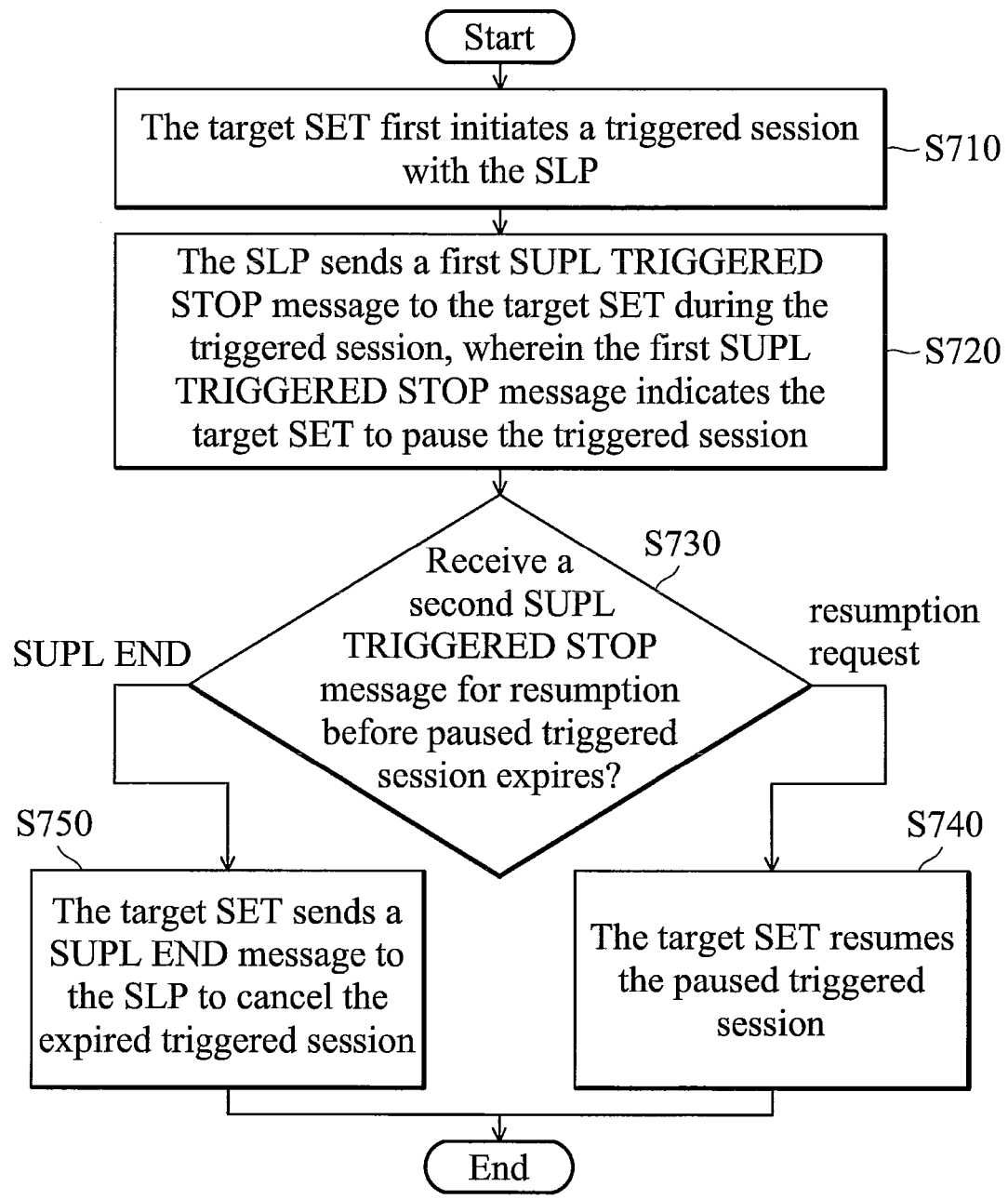
FIG. 7 is a flow chart illustrating a method for controlling an ongoing SET-initiated triggered session in compliance with the SUPL standard according to an embodiment of the invention.

FIG. 7 is a flow chart illustrating a method for controlling an ongoing SET-initiated triggered session in compliance with the SUPL standard according to an embodiment of the invention. The method may be applied in a SUPL communication environment comprising a target SET and an SLP of the target SET. To begin the method, the target SET first initiates a triggered session with the SLP (step S710). The triggered session is generally referred to as an SET-initiated triggered session. Next, the SLP sends a first SUPL TRIGGERED STOP message to the target SET during the triggered session, wherein the first SUPL TRIGGERED STOP message indicates the target SET to pause the triggered session (step S720). After that, the target SET determines whether a second SUPL TRIGGERED STOP message indicating to resume the paused triggered session is received before the paused triggered session expires (step S730). If so, the target SET resumes the paused triggered session (step S740). Otherwise, if the paused triggered session expires before receiving the second SUPL TRIGGERED STOP message, the target SET sends a SUPL END message to the SLP to cancel the expired triggered session (step S750).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for controlling an ongoing network-initiated triggered session in compliance with a Secure User Plane Location (SUPL) standard, comprising:
   initiating, by a SUPL Agent, a triggered session with a target SUPL Enabled Terminal (SET) via a SUPL Location Platform (SLP) of the target SET;
   receiving, by the SLP, a pause request for the triggered session from the SUPL Agent during the triggered session, wherein the pause request is sent by the SUPL Agent after the SUPL Agent initiated the triggered session with the target SET via the SLP;
   receiving, by the target SET, a first SUPL TRIGGERED STOP message from the SLP, wherein the first SUPL TRIGGERED STOP message indicates the target SET to pause the triggered session and is sent by the SLP in response to the pause request;
   receiving, by the SLP, a resumption request for the paused triggered session from the SUPL Agent; and
   receiving by the target SET, a second, SUPL TRIGGERED STOP message from the SLP, wherein the second SUPL TRIGGERED STOP message indicates the target SET to resume the paused triggered session and is sent by the SLP in response to the resumption request.

2. The method of claim 1, further comprising sending, by the target SET, a SUPL END message indicating that the paused triggered session has expired to the SLP, and sending, by the SLP, a pause answer to the SUPL Agent, wherein the pause answer indicates the SUPL Agent to cancel the paused triggered session.

3. A Secure User Plane Location (SUPL) Agent entity, comprising:
   A processor, wherein the processor comprises: processor logic, initiating a triggered session with a target SUPL Enabled Terminal (SET) via a SUPL Location Platform (SLP) of the target SET;
   processor logic, sending a pause request for the triggered session to the SLP during the triggered session, so as to enable the SLP to send a first SUPL TRIGGERED STOP message to the target SET to pause the triggered session, wherein the pause request is sent after the triggered session with the target SET is initiated via the SLIP; and
   processor logic, sending a resumption request for the paused triggered session to the SLP, so as to enable flae SLP to send a second SUPL TRIGGERED STOP message to the target SET to resume the paused triggered session.

4. The SUPL Agent entity of claim 3, further comprising:
   processor logic, receiving a pause answer for the paused triggered session from the SLP to cancel the paused triggered session,
   wherein the pause answer is sent by the SLP in response to receiving a SUPL END message indicating that the paused triggered session has expired from the target SET.

5. A Secure User Plane Location (SUPL) Enabled Terminal (SET), comprising:
   a wireless module performing wireless transmissions and receptions to and from a SUPL Location Platform (SLP); and
   a processor receiving a first SUPL TRIGGERED STOP message from the SLP via the wireless module, and pausing an ongoing network-initiated triggered session with a SUPL Agent in response to the first SUPL TRIGGERED STOP message,
   wherein the first SUPL TRIGGERED STOP message is sent by the SLP in response to the SLP receiving a pause request for the network-initiated triggered, session from the SUPL Agent during the network-initiated triggered session, and
   wherein the processor further receives a second SUPL TRIGGERED STOP message from the SLP via the wireless module, and resumes the paused network-initiated triggered session in response to the second SUPL TRIGGERED STOP message.

6. The SET of claim 5, wherein the second SUPL TRIGGERED STOP message is sent by the SLP in response to the SLP receiving a resumption request for the paused network-initiated triggered session from the SUPL Agent.

7. The SET of claim 5, wherein the processor further cancels the paused network-initiated triggered session and sends a SUPL END message to the SLP via the wireless module, in response to detecting that the paused network-initiated triggered session has expired.

8. The SET of claim 7, wherein the SLP sends a pause answer indicating cancellation of the paused network-initiated triggered session to the SUPL Agent, in response to receiving the SUPL END message.

9. A method for controlling an ongoing Secure User Plane Location (SUPL) Enabled Terminal (SET)-initiated triggered session, comprising:
- initiating, by a target SET, a triggered session with a SUPL Location Platform (SLP) of the target SET;
- receiving, by the target SET, a first SUPL TRIGGERED STOP message from the SLP during the triggered session, wherein the first SUPL TRIGGERED STOP message indicates the target SET to pause the triggered session; and
- receiving, by the target SET, a second SUPL TRIGGERED STOP message from the SLP, wherein the second SUPL TRIGGERED STOP message indicates the target SET to resume the paused triggered session.

10. The method of claim 9, further comprising sending, by the target SET, a SUPL END message to the SLP to cancel the paused triggered session, in response to detecting that the paused triggered session has expired.

11. A Secure User Plane Location (SUPL) Enabled Terminal (SET), comprising:
- a wireless module performing wireless transmissions and receptions to and from a SUPL Location Platform (SLP); and
- a processor initiating a triggered session with the SLP via the wireless module, receiving a first SUPL TRIGGERED STOP message from the SLP via the wireless module after the triggered session is initiated, pausing the triggered session in response to the first SUPL TRIGGERED STOP message, receiving a second SUPL TRIGGERED STOP message from the SLP via the wireless module, and resuming paused triggered session in response to the second SUPL TRIGGEI~ED STOP message.

12. The SET of claim 11, wherein the processor further sends a SUPL END message to the SLP via the wireless module to cancel the paused triggered session, in response to detecting that the paused triggered session has expired.

13. A Secure User Plane Location (SUPL) Location Platform (SLP) entity, comprising:
- A processor, wherein the processor comprises:
- processor logic, handling a triggered session initiated by a target SUPL Enabled Terminal (SET);
- processor logic, sending a first SUPL TRIGGERED STOP message to the target SET to pause the triggered session, after the triggered session is initiated; and
- processor logic sending a second SUPL TRIGGERED STOP message to the target SET to resume the paused triggered session.

14. The SLP entity of claim 13, further comprising processor logic receiving a SUPL END message indicating cancellation of the paused triggered session from the target SET, wherein the SUPL END message is sent by the target SET in response to the target SET detecting that the paused triggered session has expired.

* * * * *